United States Patent
Hyun et al.

(10) Patent No.: US 9,950,428 B2
(45) Date of Patent: Apr. 24, 2018

(54) METHOD AND SYSTEM FOR CONTROLLING WEARABLE ROBOT

(71) Applicant: HYUNDAI MOTOR COMPANY, Seoul (KR)

(72) Inventors: Dong Jin Hyun, Suwon-si (KR); Kyung Mo Jung, Seongnam-si (KR); Hyun Seop Lim, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 244 days.

(21) Appl. No.: 14/941,143

(22) Filed: Nov. 13, 2015

(65) Prior Publication Data
US 2017/0043482 A1 Feb. 16, 2017

(30) Foreign Application Priority Data
Aug. 10, 2015 (KR) .................. 10-2015-0112642

(51) Int. Cl.
*B25J 9/16* (2006.01)

(52) U.S. Cl.
CPC ........... *B25J 9/1653* (2013.01); *B25J 9/1694* (2013.01)

(58) Field of Classification Search
CPC .............................. B25J 9/1653; B25J 9/1694
USPC ....................................... 700/245, 253, 261
See application file for complete search history.

(56) References Cited

U.S. PATENT DOCUMENTS

| 8,417,382 B2 * | 4/2013 | Yoshiike | B62D 57/032 700/245 |
| 8,473,102 B2 * | 6/2013 | Andoh | B62D 57/032 700/245 |
| 9,221,177 B2 * | 12/2015 | Herr | B25J 9/1694 |
| 2011/0301756 A1 * | 12/2011 | Yoshiike | B62D 57/032 700/253 |

(Continued)

FOREIGN PATENT DOCUMENTS

| JP | 2011-217825 A | 11/2011 |
| JP | 2012-143448 A | 8/2012 |

(Continued)

OTHER PUBLICATIONS

Hyun, D. J. et al., "On the Control of Knee Exoskeleton Based on the Gait Pattern Estimated by a Simple FSR Foot Sensor," Korean Society of Precision Engineering, May 2015, (1146-1147) with English language translation.

(Continued)

*Primary Examiner* — Patrick H Mackey
(74) *Attorney, Agent, or Firm* — McDermott Will & Emery LLP (57) ABSTRACT

A method for controlling a wearable robot includes deducing a knee joint angle value of a robot using a joint angle sensor in a control unit, comparing the deduced knee joint angle value with a reference knee joint angle value previously stored in the control unit, deducing a thigh angle value using a thigh angle sensor in the control unit when the deduced knee joint angle value exceeds the reference knee joint angle value, comparing the deduced thigh angle value with a reference thigh angle value previously stored in the control unit, and setting an operation mode of the robot to a lift-up mode in the control unit when the thigh angle value exceeds the reference thigh angle value.

15 Claims, 2 Drawing Sheets

(56) References Cited

U.S. PATENT DOCUMENTS

| | | | | |
|---|---|---|---|---|
| 2013/0150980 A1* | 6/2013 | Swift | ............... | A61F 2/68 623/24 |
| 2015/0127018 A1* | 5/2015 | Lim | ............... | A61H 3/00 606/130 |
| 2016/0229055 A1* | 8/2016 | Kim | ............... | B25J 9/1633 |

FOREIGN PATENT DOCUMENTS

| | | | |
|---|---|---|---|
| JP | 2013-070785 A | | 4/2013 |
| KR | 10-2012-0062540 A | | 6/2012 |
| KR | 10-1454291 B1 | | 10/2014 |
| KR | 101454291 B1 | * | 10/2014 |
| KR | 10-2015-0062285 A | | 6/2015 |

OTHER PUBLICATIONS

Office Action issued in corresponding Korean Patent Application No. 10- 2015-0112642 dated Oct. 20, 2016.with English translation.

\* cited by examiner

METHOD AND SYSTEM FOR CONTROLLING WEARABLE ROBOT

CROSS-REFERENCE TO RELATED APPLICATION

This application claims the benefit of priority to Korean Patent Application No. 10-2015-0112642, filed on Aug. 10, 2015 with the Korean Intellectual Property Office, the disclosure of which is incorporated herein by reference.

TECHNICAL FIELD

The present disclosure relates to a method and system for controlling a wearable robot, in which torque is differently applied to a robot drive unit according to whether a wearer walks on a flat surface or walks up and down stairs, thereby being capable of reducing a load applied to the wearer during walking.

BACKGROUND

In recent years, robots have come to be widely used in many industrial fields. Wearable robots which are used by being worn by persons, as well as robots which are equipped with artificial intelligence so as to operate autonomously have been researched and developed.

The core technique in wearable robots is to detect the operation intended by a wearer and operate a robot according to the wearer's intention. Accordingly, in order to detect a wearer's intention and control a wearable robot, there are various control methods which may deduce the torque applied to joint drive units of the robots using the force applied to the robots by the movement of the wearer.

However, since these control methods are methods applied during typical walking, it is difficult to apply the methods to special cases, such as when climbing stairs.

In particular, when a wearer ascends stairs in the state of wearing a wearable robot, the wearer needs greater force in order to bear the weight of the robot. Therefore, the wearer's legs experience an increased load, related to bearing the weight, when the wearer walks up stairs.

Thus, in the case of using an existing method for controlling the operation of a wearable robot, since the load applied to a wearer while ascending stairs is greater than when the wearer is not wearing a robot, there are resultant problems related to the usefulness and efficiency of the robot.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Therefore, the present disclosure has been made in view of the above problems, and it is an object of the present disclosure to provide a method and system for controlling a wearable robot, which is capable of appropriately reducing a load applied to a wearer when the wearer walks up and down stairs as well as on a flat.

In accordance with an aspect of the present disclosure, the above and other objects can be accomplished by the provision of a method for controlling a wearable robot, which includes deducing a knee joint angle value of a robot using a joint angle sensor in a control unit, comparing the deduced knee joint angle value with a reference knee joint angle value previously stored in the control unit, deducing a thigh angle value using a thigh angle sensor in the control unit when the deduced knee joint angle value exceeds the reference knee joint angle value, comparing the deduced thigh angle value with a reference thigh angle value previously stored in the control unit, and setting an operation mode of the robot to a lift-up mode in the control unit when the thigh angle value exceeds the reference thigh angle value.

The method may further include, after the comparing the deduced knee joint angle value with a reference knee joint angle value, deducing a value of torque applied to a knee joint of the robot in the control unit when the knee joint angle value exceeds the reference knee joint angle value, comparing the deduced knee joint torque value with a reference knee joint torque value previously stored in the control unit, deducing a thigh angle value using a thigh angle sensor in the control unit when the knee joint torque value exceeds the reference knee joint torque value, comparing the deduced thigh angle value with a reference thigh angle value previously stored in the control unit, and setting an operation mode of the robot to a lift-up mode in the control unit when the thigh angle value exceeds the reference thigh angle value.

The method may further include, after the comparing the deduced knee joint angle value with a reference knee joint angle value, setting the operation mode of the robot to a flat walking mode in the control unit when the knee joint angle value is less than the reference knee joint angle value.

The method may further include, after the comparing the deduced knee joint torque value with a reference knee joint torque value, setting the operation mode of the robot to a flat walking mode in the control unit when the knee joint torque value is less than the reference knee joint torque value.

The method may further include, after the comparing the deduced thigh angle value with a reference thigh angle value, setting the operation mode of the robot to a flat walking mode in the control unit when the thigh angle value is less than the reference thigh angle value.

The method may further include, after the setting the operation mode of the robot to a flat walking mode, deducing a drive current command value to be applied to a robot drive unit, using a wearer's intention force value deduced through a torque cell, a friction compensation value deduced from movement of the robot, a gravity compensation value deduced based on gravity, and a joint restriction value deduced from the knee joint angle value, in the control unit.

The drive current command value may be deduced using the following equation:

$$I = K_{tc}F_{tc} + C_{dry}sgn(\theta) + K_d\dot{\theta} + mgl\sin(\theta_{abs}) + I_r,$$

where I: a drive current command value, $K_{tc}$: a torque cell amplification constant, $F_{tc}$: a wearer's intention force, $C_{dry}$: a dry friction constant, $\theta$: a knee joint angle value, $K_d$: a viscous friction constant, m: a lower leg mass, g: a gravitational constant, l: a distance from a knee joint to a center of gravity of a lower leg, $\theta_{abs}$ a thigh angle value, and $I_r$: a joint restriction value.

The joint restriction value may be deduced using the following equation:

If $\theta < 0$, $I_r = K_{p0}(0-\theta) - K_{d0}(0-\dot{\theta})$

If $0 \leq \theta \leq A$, $I_r = 0$, and

If $\theta > A$, $I_r = K_{pA}(A-\theta) - K_{dA}(A-\dot{\theta})$, where $I_r$: a joint restriction value, $\theta$: a knee joint angle value, $K_{p0}$: stiffness of a spring operated when the knee joint angle is less than 0°, $K_{d0}$: damping of a damper operated when the knee joint angle is less than 0°, A: a reference knee joint angle value, $K_{pA}$: stiffness of a spring operated when the knee joint angle exceeds A°, and $K_{dA}$: damping of a damper operated when the knee joint angle exceeds A°.

The viscous friction constant may be deduced by detecting whether a sole of the robot comes into contact with a ground using a plurality of sensors provided on the sole, and deducing a viscous friction constant value using detected information in the control unit.

In the deducing a viscous friction constant value, when a sensor provided at a heel of the robot sole detects contact between the sole and the ground, the control unit may deduce the viscous friction constant value as a positive value, whereas when the sensor provided at the heel of the robot sole does not detect contact between the sole and the ground, the control unit may deduce the viscous friction constant value as a negative value.

The method may further include, after the setting an operation mode of the robot to a lift-up mode, changing the knee joint angle value to an angle of 0° by a drive unit.

The changing the knee joint angle value to an angle of 0° may include setting a graph of a cosine function, in which the X-axis refers to a time and the y-axis refers to a knee joint angle value, in the control unit, adjusting a period value of the set cosine function such that a reference time, previously stored in the control unit, coincides with a time required to change the deduced knee joint angle value to the angle of 0° according to the cosine function, and changing the knee joint angle value according to the adjusted cosine function in the drive unit.

In accordance with another aspect of the present disclosure, there is provided a system for controlling a wearable robot, which includes a joint angle sensor unit for deducing a knee joint angle of a robot, a thigh angle sensor unit for deducing a thigh angle of the robot, and a control unit, which compares the deduced knee joint angle with a pre-stored reference knee joint angle value, deduces a value of torque applied to a knee joint of the robot when the deduced knee joint angle exceeds the reference knee joint angle value, compares the knee joint torque value with a pre-stored reference knee joint torque value, deduces the thigh angle when the knee joint torque value exceeds the reference knee joint torque value, compares the thigh angle with a pre-stored thigh angle reference value, and sets an operation mode of the robot to a lift-up mode when the thigh angle exceeds the thigh angle reference value.

When the knee joint angle is less than the reference knee joint angle value, the control unit may set the operation mode of the robot to a flat walking mode.

When the knee joint torque value is less than the reference knee joint torque value, the control unit may set the operation mode of the robot to a flat walking mode.

When the thigh angle is less than the reference thigh angle value, the control unit may set the operation mode of the robot to a flat walking mode.

After the operation mode of the robot is set to the flat walking mode, the control unit may deduce a drive current command value to be applied to a robot drive unit, using a wearer's intention force value deduced through a torque cell, a friction compensation value deduced from movement of the robot, a gravity compensation value deduced based on gravity, and a joint restriction value deduced from the knee joint angle.

The drive current command value may be deduced using the following equation:

$$I = K_{tc}F_{tc} + C_{dry}\text{sgn}(\dot\theta) + K_d\dot\theta + mgl\sin(\theta_{abs}) + I_r,$$

where I: a drive current command value, $K_{tc}$: a torque cell amplification constant, $F_{tc}$: a wearer's intention force, $C_{dry}$: a dry friction constant, $\dot\theta$: a knee joint angle value, $K_d$: a viscous friction constant, m: a lower leg mass, g: a gravitational constant, l: a distance from a knee joint to a center of gravity of a lower leg, $\theta_{abs}$: a thigh angle value, and $I_r$: a joint restriction value.

The joint restriction value may be deduced using the following equation:

$$\text{If } \theta<0, I_r = K_{p0}(0-\theta) - K_{d0}(0-\dot\theta),$$

$$\text{If } 0 \le \theta \le A, I_r = 0, \text{ and}$$

$$\text{If } \theta>A, I_r = K_{pA}(A-\theta) - K_{dA}(A-\dot\theta),$$

where $I_r$: a joint restriction value, $\theta$: a knee joint angle value, $K_{p0}$: stiffness of a spring operated when the knee joint angle is less than 0°, $K_{d0}$: damping of a damper operated when the knee joint angle is less than 0°, A: a reference knee joint angle value, $K_{pA}$: stiffness of a spring operated when the knee joint angle exceeds A°, and $K_{dA}$: damping of a damper operated when the knee joint angle exceeds A°.

The viscous friction constant may be deduced by detecting whether a sole of the robot comes into contact with a ground using a plurality of sensors provided on the sole, and deducing a viscous friction constant value using detected information in the control unit.

The system may further include a drive unit which changes the knee joint angle to an angle of 0°.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
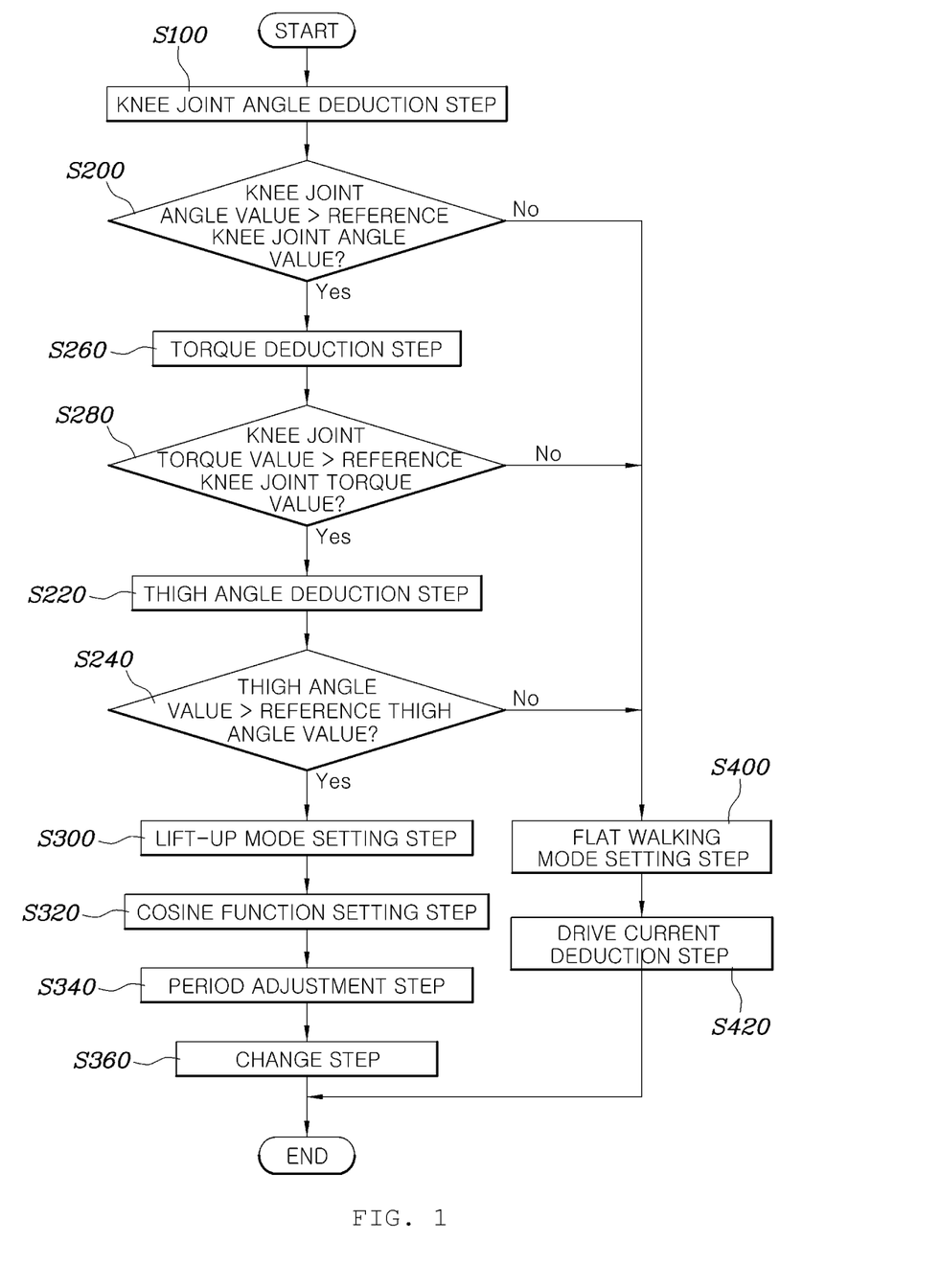
FIG. 1 is a flowchart illustrating a method for controlling a wearable robot according to an embodiment of the present disclosure.

As illustrated in FIG. 1, a method for controlling a wearable robot according to an embodiment of the present disclosure may include a knee joint angle deduction step S100 of deducing a knee joint angle value of a robot using a joint angle sensor in a control unit, a knee joint angle comparison step S200 of comparing the deduced knee joint angle value with a reference knee joint angle value which is previously stored in the control unit, a torque deduction step S260 of deducing a value of torque applied to the knee joint of the robot in the control unit when the knee joint angle value exceeds the reference knee joint angle value, a knee joint torque comparison step S280 of comparing the deduced knee joint torque value with a reference knee joint torque value which is previously stored in the control unit, a thigh angle deduction step S220 of deducing a thigh angle value using a thigh angle sensor in the control unit when the knee joint torque value exceeds the reference knee joint torque value, a thigh angle comparison step S240 of comparing the deduced thigh angle value with a reference thigh angle value which is previously stored in the control unit, and a lift-up mode setting step S300 of setting the operation mode of the robot to a lift-up mode in the control unit when the thigh angle value exceeds the reference thigh angle value.

In the knee joint angle deduction step S100, the knee joint angle value means a relative angle between the thigh and the lower leg. The state in which the knee is completely straight is set as a data point, and is referred to as an angle of 0°. The knee joint angle value means an angle which is formed by the lower leg and a line extending to the ground from the central portion of the thigh when the knee is bent. Various kinds of sensors, such as an encoder, may be used as the joint angle sensor for deducing the knee joint angle.

The knee joint angle comparison step S200 is a step of comparing the knee joint angle value, which is deduced from the knee joint angle deduction step S100, with the reference knee joint angle value which is previously stored in the control unit. The knee joint angle comparison step S200 corresponds to a portion of an algorithm that determines whether a wearer currently walks on a flat surface or up and down stairs. The previously stored reference knee joint angle value in the present step may vary for each person, but is preferably an angle of about 60°.

When the knee joint angle value exceeds the reference knee joint angle value in the knee joint angle comparison step S200, the torque deduction step S260 of deducing the value of torque applied to the knee joint of the robot is performed in the control unit. The value of torque applied to the knee joint means a value of torque which is generated while the wearer presses a spring damper provided for the restriction of an imaginary joint when bending her/his knee joint. The torque value can be deduced in various manners. That is, the torque value may be directly measured in a manner of providing a torque cell, or may also be deduced using a motor constant provided in the knee joint and a drive current command value according to the present disclosure.

In the knee joint torque comparison step S280, the deduced knee joint torque value is compared with the reference knee joint torque value which is previously stored in the control unit. The reference knee joint torque value may vary for each person, similar to the above reference knee joint angle value. However, the torque reference value is preferably a value of torque which is generated by the spring damper provided in the knee joint when the knee joint angle is approximately 60°.

When the deduced knee joint torque value exceeds the torque reference value in the knee joint torque comparison step S280, the thigh angle deduction step S220 of deducing the thigh angle value using the thigh angle sensor is performed. The thigh angle value means an angle formed by the thigh and the ground, and particularly an angle which is formed by the ground and a line extending toward the ground from the central point of the thigh. The thigh angle value may also be deduced by various sensors, and the sensors may include an IMU sensor, an encoder, etc.

The thigh angle comparison step S240 is a step of comparing the deduced thigh angle value, which is deduced from the thigh angle deduction step S220, with the reference thigh angle value which is previously stored in the control unit. The present step corresponds to an algorithm that determines whether the wearer currently walks on a flat surface or up and down stairs, similar to the above knee joint angle comparison step S200. Since the determination of whether the wearer walks up and down stairs may be inaccurate when made only based on the angle of the thigh, the thigh angle comparison step S240 is additionally performed.

Accordingly, when the thigh angle value, which is deduced using the sensor, exceeds the reference thigh angle value in the thigh angle comparison step S240, the control unit determines that the wearer currently intends to walk up stairs, and performs the lift-up mode setting step S300 of setting the operation mode of the robot to the lift-up mode. When the knee joint angle value and the thigh angle value of the wearer exceed the reference values, the control unit ultimately detects that the wearer intends to walk up stairs, and sets the operation mode of the robot to the lift-up mode.

In contrast, when the knee joint angle value is less than the reference knee joint angle value as the result of the knee joint angle comparison step, when the knee joint torque value is less than the reference knee joint torque value as the result of the knee joint angle comparison step, and when the thigh angle value is less than the reference thigh angle value as the result of the thigh angle comparison step, a flat walking mode setting step S400 of setting the operation mode of the robot to a flat walking mode is performed in the control unit.

In this case, it is determined that the wearer does not intend to walk up stairs. Therefore, the control unit determines that the wearer walks on a typical flat surface, and sets the operation mode of the robot to the flat walking mode.

Even when the robot is operated in the flat walking mode, the present disclosure proposes a method for further improving operability compared to existing wearable robots. Such a method is a drive current deduction step S420 after the flat walking mode setting step S400, as illustrated in FIG. 1.

The drive current deduction step S420 is a step of deducing a drive current command value, which will be applied to a robot drive unit, using a wearer's intention force value deduced through the torque cell, a friction compensation value deduced from the movement of the robot, a gravity compensation value deduced based on the gravity, and a joint restriction value deduced from the knee joint angle value, in the control unit.

Here, the wearer's intention force value means a force value that is required when the robot moves according to the operation intention of the wearer. The wearer's intention force value may be typically obtained by converting a wearer's intention torque value measured by the torque cell into a Jacobian value. Since the wearer's intention force value is a force value, it will typically have a unit of [kgm/s^2].

The friction compensation value is a value which compensates for frictional force generated while the robot moves according to the movement of the wearer. The frictional force according to the movement of the wearer may be generated in many places. The frictional forces that affect the smooth operation of the robot most strongly will be a frictional force between the ground, on which the wearer walks, and the robot, and a friction force between the wearer and the robot, which is generated according to the movement of the wearer.

The frictional force between the ground and the robot may be easily obtained using a typical formula $F = \mu mg$ for calculating ground frictional force. In addition, the frictional force between the wearer and the robot, which is generated according to the movement of the wearer, may be obtained using a damper coefficient of a damper and a spring constant of a spring, which connect the wearer to the robot. Since both frictional forces are expressed in a unit of force, the friction compensation value will also have a unit of [kgm/s^2].

The gravity compensation value is literally a value that compensates for gravity, which affects all objects on Earth, and will be proportional to the mass of the wearer. The gravity compensation value will also have a unit of [kgm/s^2].

The joint restriction value is a value present when the knee joint angle of the wearer is equal to or less than 0°, or is equal to or greater than the above-mentioned reference knee joint angle value. The joint restriction value is a compensation value for reducing a load transferred to the knee joint.

The joint restriction value may be expressed by the following equation:

If $\theta<0$, $I_r=K_{p0}(0-\theta)-K_{d0}(0-\dot{\theta})$,

If $0 \leq \theta \leq A$, $I_r=0$, and

If $\theta>A$, $I_r=K_{pA}(A-\theta)-K_{dA}(A-\dot{\theta})$, where $I_r$: a joint restriction value, $\theta$: a knee joint angle value, $K_{p0}$: stiffness of a spring operated when the knee joint angle is less than 0°, $K_{d0}$: damping of a damper operated when the knee joint angle is less than 0°, A: a reference knee joint angle value, $K_{pA}$: stiffness of a spring operated when the knee joint angle exceeds A°, and $K_{dA}$: damping of a damper operated when the knee joint angle exceeds A°.

As described above, the joint restriction value is a value when the knee joint angle is equal to or less than 0°, or is equal to or greater than the reference value. Therefore, the joint restriction value is "0" when the knee joint angle is between 0° and the reference value. However, when the knee joint angle is less than 0°, it is necessary to compensate for force transferred from the spring and damper which are operated to prevent the knee joint from bending. When the knee joint angle exceeds the reference value, it is necessary to compensate for force transferred from the spring and the damper, which provide a cushioning sensation, such that the knee joint angle exceeds the reference value to a certain extent.

The method of deducing a drive current in the drive current deduction step S420 may be described using the following equation:

$I=K_{tc}F_{tc}+C_{dry}sgn(\dot{\theta})+K_d\dot{\theta}+mgl\sin(\theta_{abs})+I_r$, where I: a drive current command value, $K_{tc}$: a torque cell amplification constant, $F_{tc}$: a wearer's intention force, $C_{dry}$: a dry friction constant, $\dot{\theta}$: a knee joint angle value, $K_d$: a viscous friction constant, m: a lower leg mass, g: a gravitational constant, l: a distance from the knee joint to the center of gravity of the lower leg, $\theta_{abs}$: a thigh angle value, and $I_r$: a joint restriction value.

The drive current command value means a value of current required to operate an electric motor located at the robot drive unit in order to operate the drive unit. The electric motor is a motor which receives current and outputs torque. The torque value of the drive unit may be controlled by controlling the current value of the electric motor. The present disclosure may ultimately control the operation of the robot through the drive current deduction step S420.

In the equation in the present step, the torque cell amplification constant is a conversion factor required to convert the wearer's intention force into the drive current command value. Since the force and the drive current are expressed in different units, it is necessary to express the force and the drive current in the same unit in order to perform calculations on them. Thus, the torque cell amplification constant is a conversion factor for changing the unit of the wearer's intention force to the unit of the drive current command value.

In the present disclosure, the above-mentioned friction compensation value is classified into a dry friction compensation and a viscous friction compensation according to a typical friction compensation model. The dry friction compensation may be deduced using a typical equation for calculating the friction compensation value. However, in order to express the wearer's intention force and the current value in the same unit, as described above, the dry friction constants, which are conversion factors, are respectively multiplied by them.

The viscous friction constant value may be deduced using a typical equation for calculating the friction compensation value. As illustrated above, the viscous friction compensation value is $K_d\dot{\theta}$. However, the present disclosure proposes a method of correcting the viscous friction compensation value to be suitable for the operation of the robot in order to improve the operability of the robot.

The correction of the viscous friction compensation value is equal to the correction of the viscous friction constant value. Therefore, in order to correct the viscous friction constant value, the present disclosure proposes a detection step of detecting whether a sole of the robot comes into contact with the ground using a plurality of sensors provided on the sole, and a viscous friction constant deduction step of deducing a viscous friction constant value using the detected information in the control unit.

The control unit may easily detect the current walking state of the robot through the detection step. Any sensor may be used so long as the sensors used in the present disclosure are typical FSR sensors. These sensors are provided on the surface of the sole of the robot in order to detect whether the sole comes into contact with the ground, and transfers the detected information to the control unit. The control unit may determine the walking state of the robot using the transferred information.

For example, it is assumed that five sensors are provided on the sole of the robot in the front and rear direction thereof. In this case, when the robot stands up just for support, all five sensors will send the control unit signals indicating contact between the sole and the ground. However, when the wearer begins to walk, the state varies. The swinging leg, according to the walking of the wearer, will be separated from the ground starting with the heel of the leg. Thus, a signal indicating separation between the sole and the ground will be sequentially transferred to the control unit from the sensor provided on the rear of the sole of the robot, while walking. In contrast, when the swinging leg comes into contact with the ground after the swing, a signal indicating contact between the sole and the ground will be sequentially transferred to the control unit from the sensor provided on the rear of the sole of the robot. Through the same, the control unit may accurately detect the walking state of the robot using the sensors.

As described above, the control unit of the robot may detect the walking state of the robot, and thus may deduce the viscous friction constant value. For example, the present disclosure proposes a method in which, when the sensor provided at the heel of the sole of the robot detects the contact between the sole and the ground, the control unit deduces that the viscous friction constant value is a positive value, and when the sensor provided at the heel of the sole of the robot does not detect the contact between the sole and the ground, the control unit deduces that the viscous friction constant value is a negative value.

When the heel of the sole of the robot is separated from the ground, the swinging leg is in either a state just after starting a swing or a swinging state. At this time, since viscosity is low, the viscous friction constant value may be set as a negative value. In contrast, when the swinging leg comes into momentary contact with the ground, and when the swing is completed, the heel of the sole of the robot will be in contact with the ground. At this time, since viscosity is high, the viscous friction constant value may be set as a positive value. Accordingly, in accordance with the present disclosure, since the robot is controlled in the most suitable manner according to the walking state of the robot, the operability of the robot can be improved.

The gravity compensation value may be easily deduced using the wearer's mass and the acceleration of gravity. However, the present disclosure does not use a conversion factor for converting the gravity compensation value into the unit of the current value. This is because the unit of the drive current of the electric motor used in the present disclosure is matched with the unit of the gravity compensation value. That is, since the conversion factor value for converting the gravity compensation value into the unit of the drive current may be "1", the conversion factor is not indicated in the gravity compensation value in the above equation.

The joint restriction value, which is the last component of the equation, may be deduced from the above equation. The joint restriction value is used as a conversion factor for converting the stiffness of the spring and the damping of the damper, which are indicated in the equation, to the unit of the drive current command value.

When the robot is set to the lift-up mode, instead of the flat walking mode, the wearer walks up stairs. In this case, a separate step for controlling the same is required. Therefore, the present disclosure includes a lift-up mode execution step of changing the knee joint angle value to an angle of 0° in the drive unit.

Since the knee joint angle value is changed to the angle of 0° by the drive unit in the lift-up mode execution step, the wearer's knee is completely extended by the robot. Accordingly, the wearer can easily walk up stairs without being subjected to a load when ascending stairs.

The method of changing the knee joint angle value to the angle of 0° may be performed in various manners, but it is preferable that the change be naturally performed so as not to affect the wearer. When the knee joint angle is rapidly changed in a very short time, the wearer may be subject to a load.

To this end, when operating in the lift-up mode, the present disclosure proposes a method of changing the knee joint angle through a cosine function setting step S320 of setting a graph of a cosine function, in which the X-axis refers to a time and the y-axis refers to a knee joint angle value, in the control unit, a period adjustment step S340 of adjusting a period value of the set cosine function such that a reference time, which is previously stored in the control unit, coincides with a time required to change the deduced knee joint angle value to the angle of 0° according to the cosine function, and a change step S360 of changing the knee joint angle value according to the adjusted cosine function in the drive unit.

In accordance with the present disclosure, since the knee joint angle value is smoothly changed to an angle of 0° according to the cosine function graph, the wearer is not subjected to a load when the knee joint angle is changed by the drive unit.

The period adjustment step S340 is critical to the present step. Through the period adjustment step S340, the wearer may walk up stairs within a desired time. In the present step, the desired time of the wearer corresponds to a reference time which is previously stored in the control unit. Since the period of the cosine function is matched with a period for performing the reference time in the present step, the wearer may walk up stairs within a desired time. In the period adjustment step S340, the reference time may be variously adjusted according to the state of the wearer, the purpose, and the type of robot.

Only the cosine function is mentioned in the present disclosure. However, since a sine function is merely time-shifted from the cosine function, the sine function may also be used.

Figure 2:
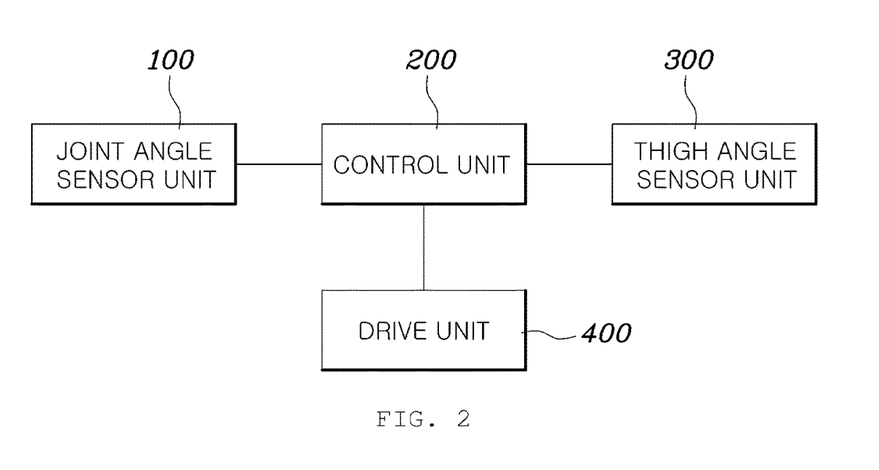
FIG. 2 is a configuration diagram illustrating a system for controlling a wearable robot according to an embodiment of the present disclosure.

As illustrated in FIG. 2, a system for controlling a wearable robot according to an embodiment of the present disclosure may include a joint angle sensor unit 100 for deducing a knee joint angle of a robot, a thigh angle sensor unit 200 for deducing a thigh angle of the robot, and a control unit 200, which compares the deduced knee joint angle and thigh angle with predetermined values, sets the operation mode of the robot to a flat walking mode when the deduced knee joint angle is equal to or less than the predetermined knee joint angle value, and sets the operation mode of the robot to a lift-up mode when the deduced knee joint angle and thigh angle exceed the predetermined knee joint angle value and thigh angle values.

As described in the above method, when the knee joint angle value is less than the reference knee joint angle value, when the knee joint torque value is less than the reference knee joint torque value, and when the thigh angle value is less than the reference thigh angle value, the control unit 200 will set the operation mode of the robot to the flat walking mode.

In addition, in the system for controlling a wearable robot according to the embodiment of the present disclosure, after setting the flat walking mode, the control unit deduces a drive current command value, which will be applied to a robot drive unit, using a wearer's intention force value deduced through a torque cell, a friction compensation value deduced from the movement of the robot, a gravity compensation value deduced based on the gravity, and a joint restriction value deduced from the knee joint angle value. The drive current command value may be deduced using the following equation:

$$I = K_{tc}F_{tc} + C_{dry}sgn(\theta) + K_d\theta + mgl\sin(\theta_{abs}) + I_r,$$

where I: a drive current command value, $K_{tc}$: a torque cell amplification constant, $F_{tc}$: a wearer's intention force, $C_{dry}$: a dry friction constant, $\theta$: a knee joint angle value, $K_d$: a viscous friction constant, m: a lower leg mass, g: a gravitational constant, l: a distance from the knee joint to the center of gravity of the lower leg, $\theta_{abs}$: a thigh angle value, and $I_r$: a joint restriction value.

As described above, the joint restriction value may also be deduced using the following equations:

$$\text{If } \theta<0, I_r=K_{p0}(0-\theta)-K_{d0}(0-\dot\theta),$$

$$\text{If } 0\leq\theta\leq A, I_r=0, \text{ and}$$

$$\text{If } \theta>A, I_r=K_{pA}(A-\theta)-K_{cA}(A-\dot\theta),$$

where $I_r$: a joint restriction value, $\theta$: a knee joint angle value, $K_{p0}$: stiffness of a spring operated when the knee joint angle is less than 0°, $K_{d0}$: damping of a damper operated when the knee joint angle is less than 0°, A: a reference knee joint angle value, $K_{pA}$: stiffness of a spring operated when the knee joint angle exceeds A°, and $K_{dA}$: damping of a damper operated when the knee joint angle exceeds A°.

As described above, the viscous friction constant value is deduced by detecting whether the sole of the robot comes into contact with the ground using the plurality of sensors provided on the sole, and by means of the detected information.

In addition, the system for controlling a wearable robot may include a drive unit 400 which changes the knee joint angle value to an angle of 0°. The method of changing the knee joint angle value to the angle of 0° may be performed in various manners. However, as described above, in order to reduce the load on the wearer, it is preferable that the cosine function, which is deduced through the cosine function setting step S320 and the period adjustment step S340, be transferred from the drive unit 400 to the control unit 200, and that the knee joint angle value be changed according to the adjusted cosine function.

As is apparent from the above description, the present disclosure can obtain the following effects.

First, since the operation of the robot is controlled differently according to whether the robot walks on a flat surface or climbs stairs, the robot can have improved control efficiency.

Secondly, since the different control algorithms are applied to the robot using the sensor thereof according to the walking state, the robot can have improved walking control performance.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for controlling a wearable robot, comprising:
   deducing a knee joint angle value of a robot using a joint angle sensor in a control unit;
   comparing the deduced knee joint angle value with a reference knee joint angle value previously stored in the control unit;
   deducing a thigh angle value using a thigh angle sensor in the control unit when the deduced knee joint angle value exceeds the reference knee joint angle value;
   comparing the deduced thigh angle value with a reference thigh angle value previously stored in the control unit; and
   setting an operation mode of the robot to a lift-up mode in the control unit when the thigh angle value exceeds the reference thigh angle value,
   wherein the method further comprises:
      after the step of comparing the deduced knee joint angle value with a reference knee joint angle value, setting the operation mode of the robot to a flat walking mode in the control unit when the knee joint angle value is less than the reference knee joint angle value,
      after the step of setting the operation mode of the robot to a flat walking mode, deducing a drive current command value to be applied to a robot drive unit, using a wearer's intention force value deduced through a torque cell, a friction compensation value deduced from movement of the robot, a gravity compensation value deduced based on gravity, and a joint restriction value deduced from the knee joint angle value, in the control unit, and wherein the drive current command value is deduced using the following equation:

$$I = K_{tc}F_{tc} + C_{dry}sgn(\theta) + K_d\dot\theta + mgl\sin(\theta_{abs}) + I_r,$$

where I is a drive current command value, $K_{tc}$ is a torque cell amplification constant, $F_{tc}$ is a wearer's intention force, $C_{dry}$ is a dry friction constant, θ is a knee joint angle value, $K_d$ is a viscous friction constant, m is a lower leg mass, g is a gravitational constant, l is a distance from a knee joint to a center of gravity of a lower leg, $\theta_{abs}$ is a thigh angle value, and $I_r$ is a joint restriction value.

2. The method according to claim 1, further comprising:
   after the step of comparing the deduced knee joint angle value with a reference knee joint angle value,
   deducing a value of torque applied to a knee joint of the robot in the control unit when the knee joint angle value exceeds the reference knee joint angle value;
   comparing the deduced knee joint torque value with a reference knee joint torque value previously stored in the control unit;
   deducing a thigh angle value using a thigh angle sensor in the control unit when the knee joint torque value exceeds the reference knee joint torque value;
   comparing the deduced thigh angle value with a reference thigh angle value previously stored in the control unit; and
   setting an operation mode of the robot to a lift-up mode in the control unit when the thigh angle value exceeds the reference thigh angle value.

3. The method according to claim 2, further comprising, after the step of comparing the deduced knee joint torque value with a reference knee joint torque value, setting the operation mode of the robot to a flat walking mode in the control unit when the knee joint torque value is less than the reference knee joint torque value.

4. The method according to claim 2, further comprising, after the step of comparing the deduced thigh angle value with a reference thigh angle value, setting the operation mode of the robot to a flat walking mode in the control unit when the thigh angle value is less than the reference thigh angle value.

5. The method according to claim 2, further comprising, after the step of setting an operation mode of the robot to a lift-up mode, changing the knee joint angle value to an angle of 0° by a drive unit.

6. The method according to claim 5, wherein the changing the knee joint angle value to an angle of 0° comprises:
   setting a graph of a cosine function, in which the X-axis refers to a time and the y-axis refers to a knee joint angle value, in the control unit;
   adjusting a period value of the set cosine function such that a reference time, previously stored in the control unit, coincides with a time required to change the deduced knee joint angle value to the angle of 0° according to the cosine function; and
   changing the knee joint angle value according to the adjusted cosine function by the drive unit.

7. The method according to claim 1, wherein the joint restriction value is deduced using the following equation:

If $\theta<0$, $I_r=K_{p0}(0-\theta)-K_{d0}(0-\dot\theta)$

If $0\leq\theta\leq A$, $I_r=0$, and

If $\theta>A$, $I_r=K_{pA}(A-\theta)-K_{dA}(A-\dot\theta)$, where $I_r$ is a joint restriction value, θ is a knee joint angle value, $K_{p0}$ is stiffness of a spring operated when the knee joint angle is less than 0°, $K_{d0}$ is damping of a damper operated when the knee joint angle is less than 0°, A is a reference knee joint angle value, $K_{pA}$ is stiffness of a spring operated when the knee joint angle exceeds A°, and $K_{dA}$ is damping of a damper operated when the knee joint angle exceeds A°.

8. The method according to claim 1, wherein the viscous friction constant is deduced by:
   detecting whether a sole of the robot comes into contact with a ground using a plurality of sensors provided on the sole; and
   deducing a viscous friction constant value using detected information in the control unit.

9. The method according to claim 8, wherein, in the step of deducing a viscous friction constant value, when a sensor provided at a heel of the robot sole detects contact between the sole and the ground, the control unit deduces the viscous friction constant value as a positive value, whereas when the sensor provided at the heel of the robot sole does not detect contact between the sole and the ground, the control unit deduces the viscous friction constant value as a negative value.

10. A system for controlling a wearable robot, comprising:
   a joint angle sensor unit for deducing a knee joint angle of a robot;
   a thigh angle sensor unit for deducing a thigh angle of the robot; and
   a control unit, which compares the deduced knee joint angle with a pre-stored reference knee joint angle value, deduces a value of torque applied to a knee joint of the robot when the deduced knee joint angle exceeds the reference knee joint angle value, compares the knee joint torque value with a pre-stored reference knee joint torque value, deduces the thigh angle when the knee joint torque value exceeds the reference knee joint torque value, compares the thigh angle with a pre-stored thigh angle reference value, and sets an operation mode of the robot to a lift-up mode when the thigh angle exceeds the thigh angle reference value,
   wherein, when the knee joint angle is less than the reference knee joint angle value, the control unit sets the operation mode of the robot to a flat walking mode,
   wherein, after the operation mode of the robot is set to the flat walking mode, the control unit deduces a drive current command value to be applied to a robot drive unit, using a wearer's intention force value deduced through a torque cell, a friction compensation value deduced from movement of the robot, a gravity compensation value deduced based on gravity, and a joint restriction value deduced from the knee joint angle, and
   wherein the drive current command value is deduced using the following equation:

$$I = K_{tc}F_{tc} + C_{dry}sgn(\theta) + K_d\theta + mgl\sin(\theta_{abs}) + I_r,$$

where I is a drive current command value, $K_{tc}$ is a torque cell amplification constant, $F_{tc}$ is a wearer's intention force, $C_{dry}$ is a dry friction constant, θ is a knee joint angle value, $K_d$ is a viscous friction constant, m is a lower leg mass, g is a gravitational constant, l is a distance from a knee joint to a center of gravity of a lower leg, $\theta_{abs}$ is a thigh angle value, and $I_r$ is a joint restriction value.

11. The system according to claim 10, wherein, when the knee joint torque value is less than the reference knee joint torque value, the control unit sets the operation mode of the robot to a flat walking mode.

12. The system according to claim 10, wherein, when the thigh angle is less than the reference thigh angle value, the control unit sets the operation mode of the robot to a flat walking mode.

13. The system according to claim 10, wherein the joint restriction value is deduced using the following equation:

If $\theta<0$, $I_r = K_{p0}(0-\theta) - K_{d0}(0-\dot{\theta})$

If $0 \leq \theta \leq A$, $I_r = 0$, and

If $\theta > A$, $I_r = K_{pA}(A-\theta) - K_{dA}(A-\dot{\theta})$, where $I_r$ is a joint restriction value, θ is a knee joint angle value, $K_{p0}$ is stiffness of a spring operated when the knee joint angle is less than 0°, $K_{do}$ is damping of a damper operated when the knee joint angle is less than 0°, A is a reference knee joint angle value, $K_{pA}$ is stiffness of a spring operated when the knee joint angle exceeds A°, and $K_{dA}$ is damping of a damper operated when the knee joint angle exceeds A°.

14. The system according to claim 10, wherein the viscous friction constant is deduced by detecting whether a sole of the robot comes into contact with a ground using a plurality of sensors provided on the sole, and deducing a viscous friction constant value using detected information in the control unit.

15. The system according to claim 10, further comprising a drive unit which changes the knee joint angle to an angle of 0°.

* * * * *